(12) United States Patent
Hassan et al.

(10) Patent No.: US 7,602,911 B2
(45) Date of Patent: Oct. 13, 2009

(54) METHOD AND SYSTEM FOR ENHANCING CRYPTOGRAPHY-BASED SECURITY

(75) Inventors: Amer A. Hassan, Kirkland, WA (US); Christopher J. Corbett, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 11/079,624

(22) Filed: Mar. 14, 2005

(65) Prior Publication Data

US 2006/0204005 A1 Sep. 14, 2006

(51) Int. Cl.
*H04L 15/08* (2006.01)
*H04L 15/04* (2006.01)

(52) U.S. Cl. .......................................... 380/44; 380/46

(58) Field of Classification Search ......... 380/240–244, 380/44, 46–47, 277–280, 286
See application file for complete search history.

(56) References Cited

U.S. PATENT DOCUMENTS

| | | | |
|---|---|---|---|
| 4,203,166 A | | 5/1980 | Ehrsam et al. |
| 4,227,253 A | | 10/1980 | Ehrsam et al. |
| 5,347,580 A | | 9/1994 | Molva et al. |
| 6,292,896 B1 | | 9/2001 | Guski et al. |
| 6,535,607 B1 | | 3/2003 | Chandersekaran et al. |
| 7,096,505 B2 * | | 8/2006 | Vasudevan et al. ............. 726/30 |
| 2002/0131590 A1 * | | 9/2002 | Henson et al. ................ 380/44 |
| 2003/0044020 A1 | | 3/2003 | Aboba et al. |
| 2003/0135464 A1 | | 7/2003 | Mourad et al. |
| 2004/0049585 A1 | | 3/2004 | Swander |
| 2005/0111666 A1 * | | 5/2005 | Blom et al. ................. 380/277 |

OTHER PUBLICATIONS

Anonymous, "Announcing the Advanced Encryption Standard (AES)," *Federal Information Processing Standards Publication* 197, pp. 1-51, National Institute of Standards and Technology (Nov. 2001).
Dierks et al., "The TLS Protocol," *Network Working Group RFC 2246*, pp. 1-80, Version 1.0, The Internet Society (Jan. 1999).
Knuth, D., "Random Numbers," *The Art of Computer Programming*, vol. 2: Seminumerical Algorithms, Chapter 3, Second Edition, Addison Wesley (1982).

* cited by examiner

*Primary Examiner*—Jung Kim
*Assistant Examiner*—Venkat Perungavoor
(74) *Attorney, Agent, or Firm*—Wolf, Greenfield & Sacks, P.C.

(57) ABSTRACT

As part of a cryptographic protocol, or in addition to it, a computer may participate in a cryptographic key generation protocol. The cryptographic key generation protocol may be such that it generates a set of bits sufficient for a cryptographic key and, also, one or more additional bits. The cryptographic protocol may have one or more parameters, and the parameters of the cryptographic protocol may be varied as a function of the additional bits generated by the cryptographic key generation protocol. The cryptographic protocol may specify a set of one or more cryptographic key sizes. An overkey may be generated that is at least one bit greater than the set of cryptographic key sizes specified by the cryptographic protocol. The parameters of the cryptographic protocol may then be varied as a function of some subset of bits of the overkey. Cryptography-based security may thus be enhanced.

20 Claims, 7 Drawing Sheets

METHOD AND SYSTEM FOR ENHANCING CRYPTOGRAPHY-BASED SECURITY

FIELD OF THE INVENTION

This invention pertains generally to computer system security and, more particularly, to computer system security that has its basis in cryptography.

BACKGROUND OF THE INVENTION

Computers connected by networks have become a common means of communication. Modern computer networks may have many millions of nodes and, as a result, much of the virtue and, in particular, vice of any larger community. At times, there is a need for secure communication between computers. This is true even of smaller computer networks. Such secure communication may include private communication as well as authenticated communication. Of the methods for achieving secure communication, methods based on cryptography are among the most reliable and popular.

Cryptographic protocols securing communication typically have one or more parameters, some of which may not be explicit. For example, a specification of a cryptographic protocol may specify some parameters as required and others as optional. In addition, the cryptographic protocol may have parameters that are not explicitly set forth in the specification. Although protocol designers may make efforts to minimize such parameters.

An adversary desiring to compromise a particular cryptographic protocol may attempt to characterize one or more of the parameters of the cryptographic protocol. At least one parameter of the cryptographic protocol is typically designed to be resistant to such characterization. A cryptographic protocol with multiple characterization-resistant parameters may be more secure.

A problem is that, over time, protocol parameters may become less resistant to characterization, for example, because of technical advances. Another problem is that protocol parameters may not be as resistant to characterization as commonly believed. The cryptographic protocol may even have parameters, perhaps not known to the protocol designers, that are relatively easy to characterize. Characterization of one parameter, even if it does not lead to direct security compromise, may lead to characterization of some other, perhaps more significant parameter. Parameter regularities, in particular, may be a problem.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, a computer facilitates secure communications by participating in a cryptographic protocol. As part of the cryptographic protocol, or in addition to it, the computer may participate in a cryptographic key generation protocol. The cryptographic key generation protocol may be such that it generates a set of bits sufficient for a cryptographic key and, also, in most instances one or more additional bits. The number of additional bits may vary from one generative instance to another. The cryptographic protocol may have one or more parameters, and the parameters of the cryptographic protocol may be varied as a function of the additional bits generated by the cryptographic key generation protocol. Cryptography-based security may thus be enhanced.

The cryptographic protocol may specify a set of one or more cryptographic key sizes. For example, these may be cryptographic key sizes suitable for use by the cryptographic protocol to encrypt data. In an embodiment of the invention, an overkey is generated that is at least one bit greater than the set of cryptographic key sizes specified by the cryptographic protocol. The parameters of the cryptographic protocol may then be varied as a function of some subset of bits of the overkey. In an embodiment of the invention, a secure communications module is configured to participate in the cryptographic protocol. In addition, an overkey module may be configured to generate the overkey and vary the parameters of the cryptographic protocol.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
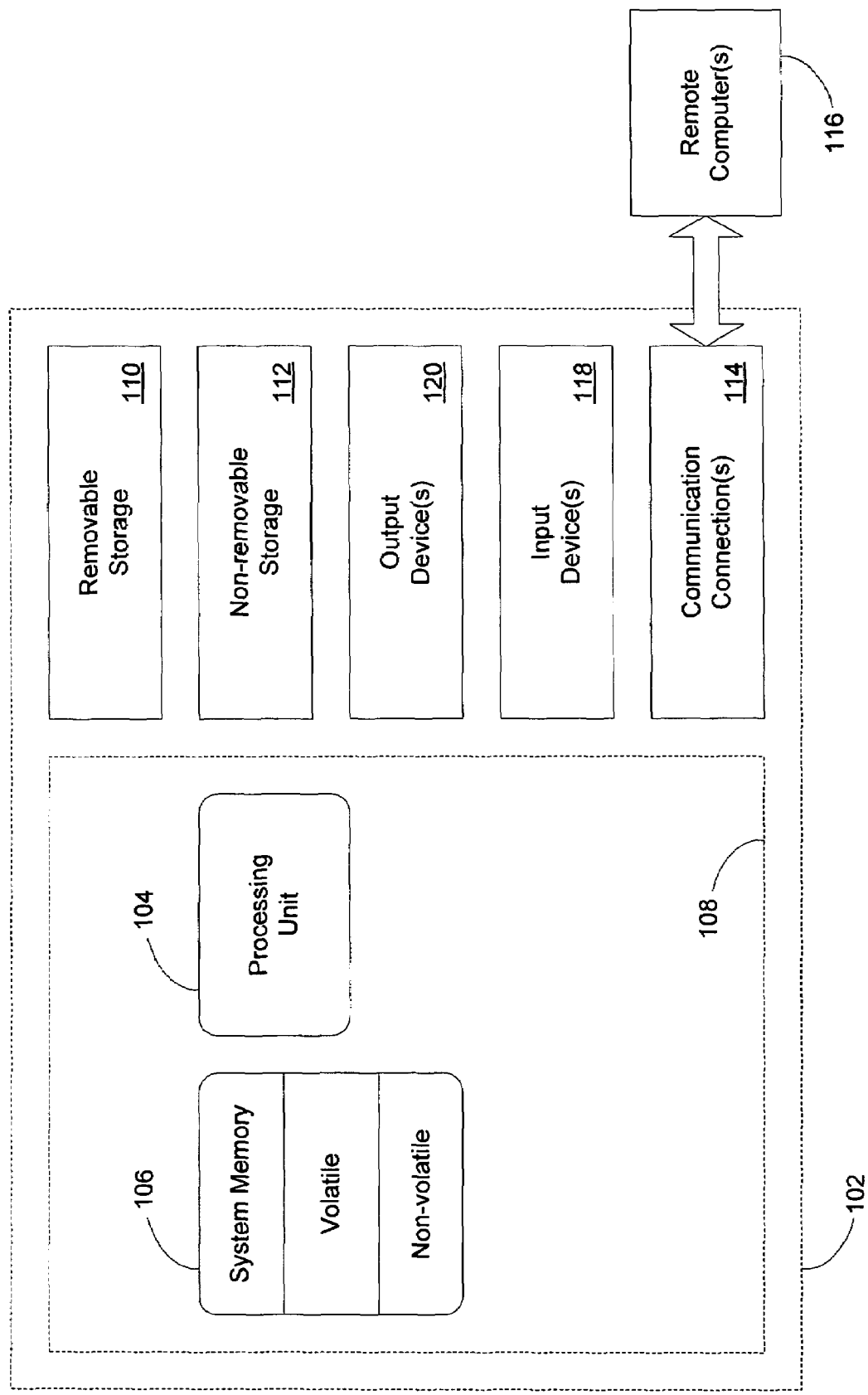
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
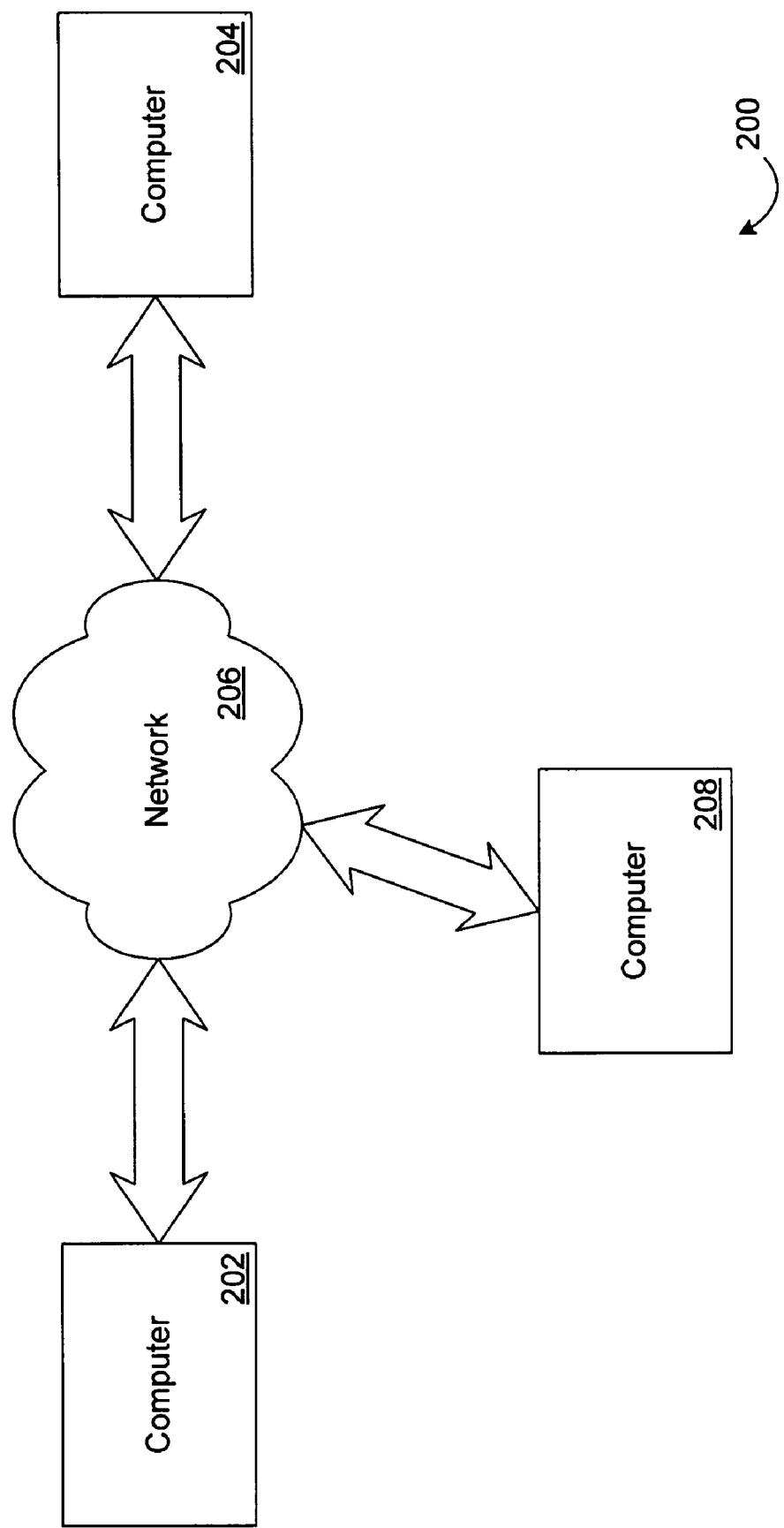
FIG. 2 is a schematic diagram illustrating an example computing environment suitable for incorporating aspects of the invention.

In an embodiment of the invention, the security of a cryptographic protocol is enhanced by varying one or more parameters of the cryptographic protocol. The cryptographic protocol may be carried out between computers (such as the computer 102), computer components and/or computer systems. FIG. 2 illustrates an example computing environment 200 suitable for incorporating aspects of the invention.

A first computer 202 communicates with a second computer 204 over a network 206. The communication between the first computer 202 and the second computer 204 may be secure or insecure or a combination of secure and insecure. The secure part(s) of the communication may be established and/or performed with the cryptographic protocol. In this example, a third computer 208 is a malicious node of the computing environment 200 attempting to compromise some or all of the secure communication between the first computer 202 and the second computer 204.

For clarity in what follows, embodiments of the invention will be described in the context of the example scenario illustrated by FIG. 2, however, embodiments of the invention are not so limited. In particular, cryptographic protocols may be carried out between components of a single computer such as the computer 102 (FIG. 1). For further clarity, the following examples will be directed to privacy aspects of security; however, as will be appreciated by those of skill in the art, the associated techniques may be applied to other aspects of security such as authentication and integrity.

Communication security may be facilitated with encryption. For example, a particular cryptographic protocol may specify that a message be encrypted by the computer 202 before being sent to the computer 204. Then, if the message is intercepted and/or copied by the computer 208, it will be unreadable unless, for example, the computer 208 is able to decrypt the message.

Figure 3:
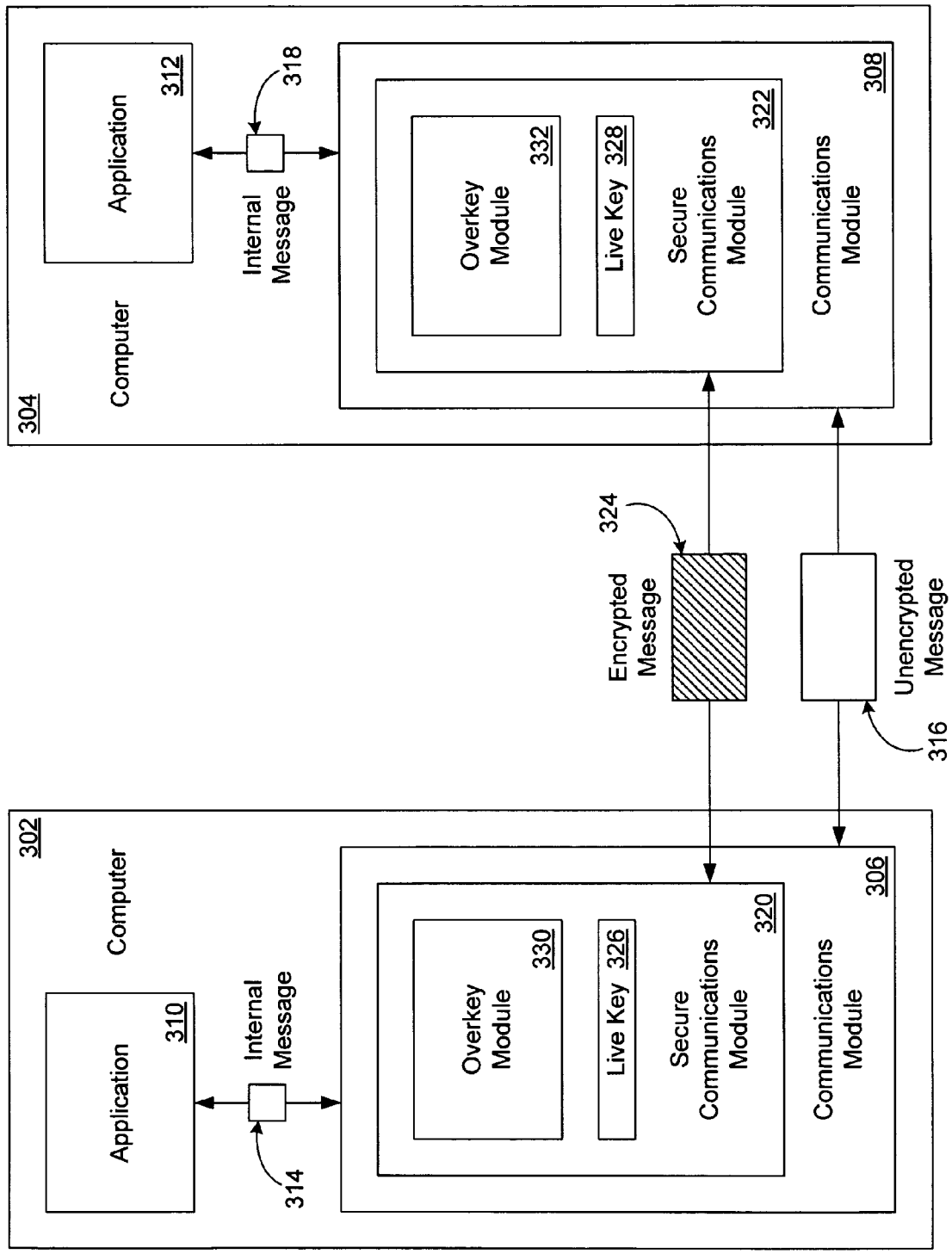
FIG. 3 is a schematic diagram depicting an example computer system architecture in accordance with an embodiment of the invention.

FIG. 3 depicts an example architecture capable of implementing cryptographic protocols in accordance with an embodiment of the invention. Computers 302 and 304 may communicate according to a cryptographic protocol. For example, the computer 302 may take the part of the computer 202 (FIG. 2) and the computer 304 may take the part of the computer 204 or the computer 208.

Each computer 302, 304 may have a communications module 306, 308 that is incorporated into and/or maintains one or more communication connections 114 (FIG. 1). An application 310 (e.g., a set of executable instructions in system memory 106) at the computer 302 may communicate with an application 312 at the computer 304 by internally passing/sending a message 314 to the communications module 306. The communications module 306 of the computer 302 may then send a message 316 to the communications module 308 of the computer 304. The communications module 308 may then internally pass/send a message 318 to the application 312. For example, communication between the applications 310, 312 may be in accordance with the International Standards Organization (ISO) Open Systems Interconnection (OSI) series of standards (ISO 7498).

Each communications module 306, 308 may include a secure communications module 320, 322. Although, in this example, each secure communications module 320, 322 is incorporated into a respective communications module 306, 308, each embodiment of the invention is not so limited. If the applications 310, 312 request secure communication (e.g., by so indicating as part of the messages 314 and/or 318), the communications modules 306, 308 may invoke the secure communications modules 320, 322. For example, the secure communications module 320 at the computer 302 may encrypt the message 314 and pass/send it in an encrypted message 324 to the secure communications module 322 at the computer 304. The secure communications module 322 may decrypt the encrypted message 324 to recover the message 314 to be passed/sent to the application 312 as the message 318.

In this example, each secure communications module 320, 322 is configured with a cryptographic key 326, 328. The cryptographic keys 324, 326 may operate in corresponding pairs. Messages such as the encrypted message 324 encrypted with the key 326 may be easily decrypted (e.g., with relatively low computational effort) with the corresponding key 328. Decryption without the corresponding key 328 may be difficult (e.g., require excessive computational effort) or even impossible for practical purposes within a given period of time. Although in this example, the keys 326, 328 are identical (i.e., symmetric), each embodiment of the invention is not so limited (e.g., the keys 326, 328 may be corresponding ones of asymmetric pairs).

Configuring the secure communications modules 320, 322 with corresponding cryptographic keys 326, 328 (i.e., key distribution) in a way that avoids compromise may be challenging, particularly for cryptographic protocols employing symmetric keys. For example, simply copying the key 326 at computer 302 and then sending it in the unencrypted message 316 to the computer 304 means that the key may be intercepted by a third party such as the computer 208. The third party may then decrypt each encrypted message 324 in a manner similar to the intended recipient, computer 304, thus compromising the security of the transmission.

Any suitable cryptographic key generation and distribution scheme may be incorporated into an embodiment of the invention. However, in an embodiment of the invention, it is overkeys that are generated and distributed, for example, with a cryptographic key generation protocol, and then live keys may be derived from the overkeys. Overkeys and suitable cryptographic key generation protocols are described below in more detail with reference to FIGS. 4, 5 and 6.

Each secure communications module 320, 322 may include an overkey module 330, 332. Overkey modules 330, 332 may generate and/or distribute overkeys. Overkey modules 330, 332 may derive live keys 326, 328 from overkeys and otherwise configure parameters of cryptographic protocols performed by secure communications modules 320, 322. Although, in this example, each overkey module 330, 332 is incorporated into a respective secure communications module 320, 322, each embodiment of the invention is not so limited. As will be appreciated by one of skill in the art, the computers 302, 304, the communications modules 306, 308, the secure communications modules 320, 322 and the overkey modules 330, 332 need not be identical pairs of the respective modules, but may instead be, for example, compatible versions of the respective modules.

Standard cryptographic protocols, such as the Transport Layer Security (TLS) protocol described by Dierks et al. "The TLS Protocol," RFC 2246, January 1999, may incorporate encryption algorithms, such as the Advanced Encryption Standard (AES) described by Federal Information Processing Standards Publication 197 (FIPS PUB 197) "Specification for the Advanced Encryption Standard (AES)", published by the National Institute of Standards and Technology (NIST) during November 2001, that utilize cryptographic keys with standard sizes. Examples of standard key sizes include 40 bits, 56 bits, 128 bits, 192 bits and 256 bits. Standard key sizes may include any suitable key size specified by a particular cryptographic protocol.

Figure 4:
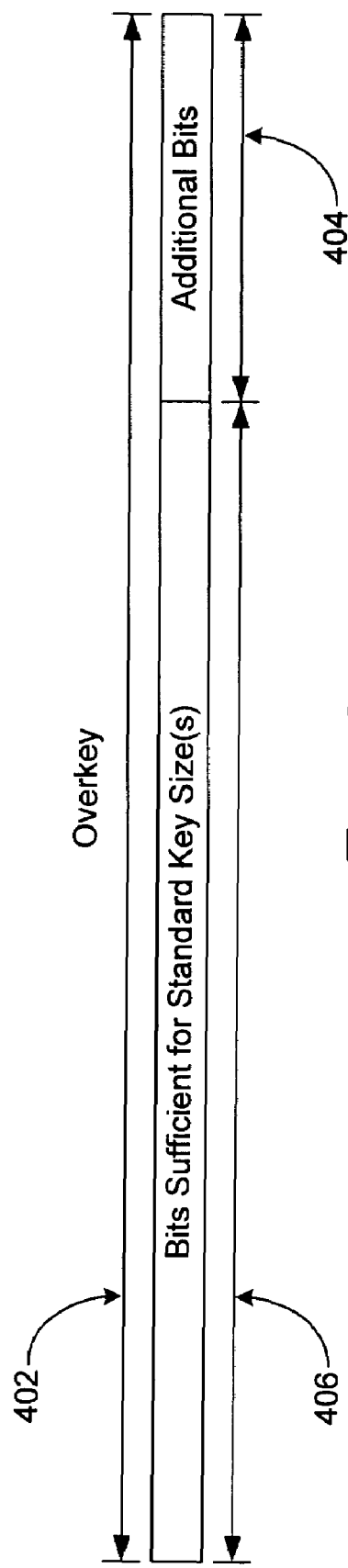
FIG. 4 is a data structure diagram depicting an example overkey in accordance with an embodiment of the invention.

In an embodiment of the invention, an overkey is generated that is larger than one or more standard key sizes employed by the cryptographic protocol, for example, the cryptographic protocol performed by the secure communications modules 320 and 322. FIG. 4 depicts an example overkey 402 in accordance with an embodiment of the invention. The overkey 402 includes bits 404 over and above bits 406 sufficient to provide for the standard key size(s).

In an embodiment of the invention, a key subset of bits is extracted from the overkey 402 to serve as the live key 326, 328 (FIG. 3) employed by the cryptographic protocol. The size of the key subset may be one of the standard key sizes. The key subset of bits may be the initial bits 406 of the overkey 402. However, each embodiment of the invention is not so limited. The key subset of bits may be any suitable subset of the overkey 402. The bits in the key subset need not correspond to contiguous bits of the overkey 402. An order of the bits in the key subset need not be the same as an order of the bits in the overkey 402.

Figure 5:
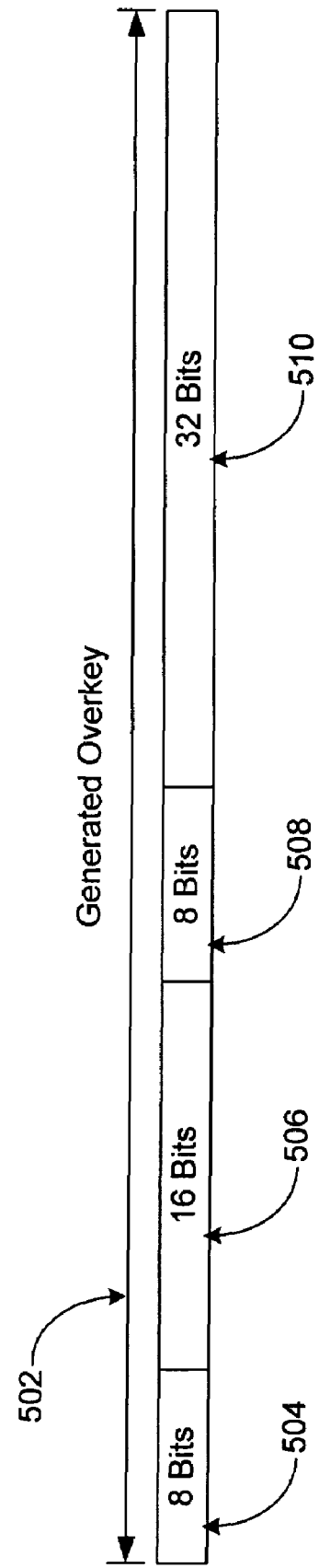
FIG. 5 is a data structure diagram depicting example generation details of an overkey in accordance with an embodiment of the invention.

In an embodiment of the invention, the additional one or more bits 404 of the overkey 402 are a result of an overkey 402 generation process. The overkey 402 generation process may generate the overkey 402 in parcels of one or more bits. For example, FIG. 5 shows a 64 bit overkey 502 generated in four parcels 504, 506, 508 and 510 with sizes of 8 bits, 16 bits, 8 bits and 32 bits respectively. For example, the overkey 502 is suitable for providing standard keys with sizes that include 40 bits and/or 56 bits.

In an embodiment of the invention, the size of each parcel is a power of 2; however, each embodiment of the invention is not so limited. The overkey 502 need not be assembled from the parcels 504, 506, 508, 510 in the order that the parcels 504, 506, 508, 510 are generated. The parcels 504, 506, 508, 510 may be assembled to form the overkey 502 in any suitable order. The bits in each parcel 504, 506, 508, 510 may be generated by a pseudo-random number generator (PRNG) designed to ensure cryptographic quality (e.g., statistical and/or spectral randomness) of the bits, independent of parcel size.

Figure 6:
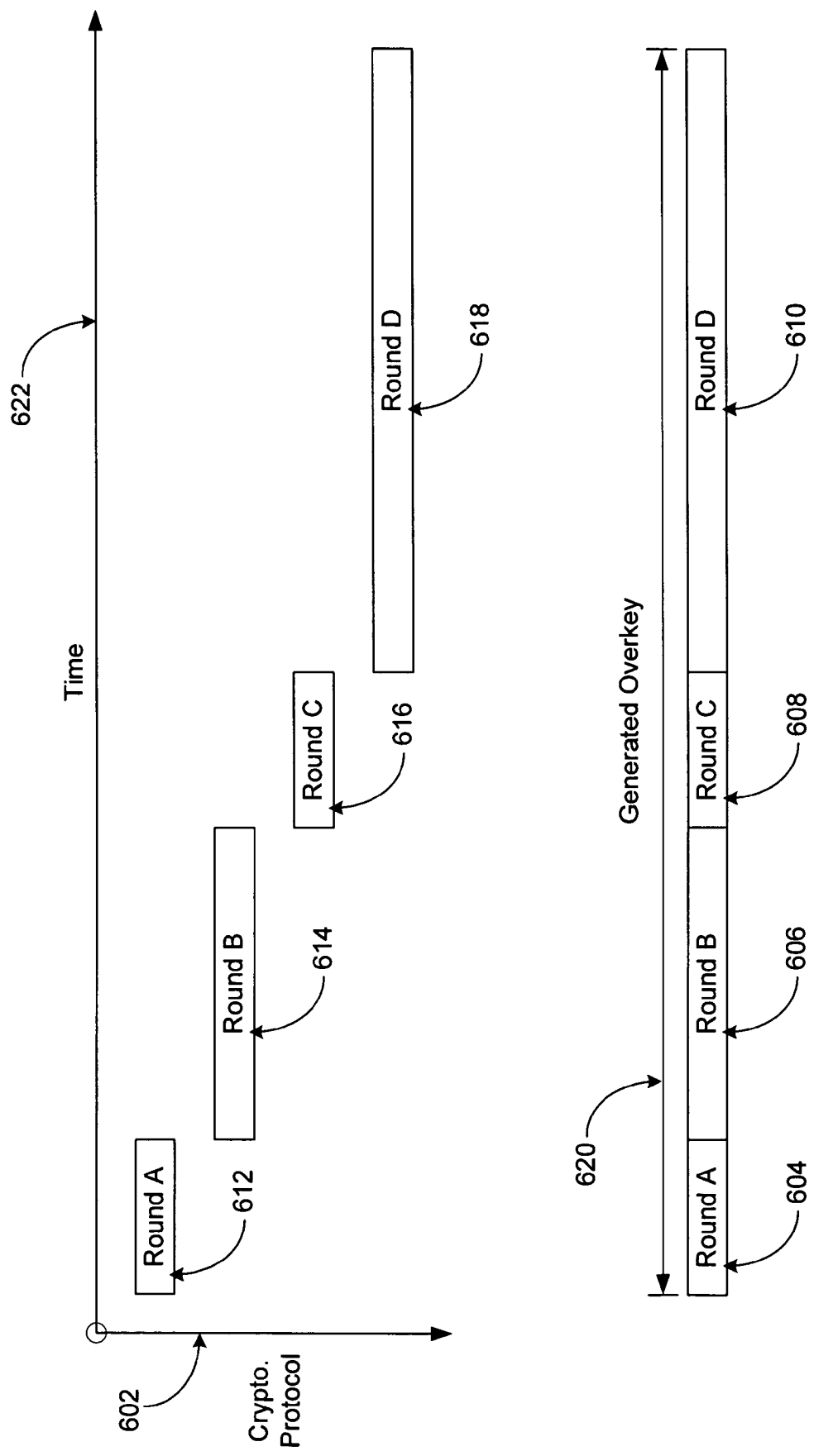
FIG. 6 is a schematic protocol diagram depicting overkey generation protocol details in accordance with an embodiment of the invention.

The parcels 504, 506, 508, 510 may be generated by a cryptographic protocol having one or more rounds, for example, by the cryptographic protocol performed by secure communications modules 320, 322 (FIG. 3). FIG. 6 schematically illustrates an example cryptographic protocol 602 generating four parcels 604, 606, 608, 610 in four rounds 612, 614, 616, 618. The parcels 604, 606, 608, 610 may be combined to form an overkey 620. Sizes of the parcels 604, 606, 608, 610 may correspond to the sizes of the parcels 504, 506, 508, 510 (FIG. 5). A size of the overkey 620 may be a sum of the sizes of the parcels 604, 606, 608, 610. The horizontal axis 622 indicates that the parcels 612, 614, 616, 618 may be generated in a temporal order. The time required to generate each parcel 604, 606, 608, 610 need not be proportional to the size of the parcel 604, 606, 608, 610.

The size of each parcel 604, 606, 608, 610 may be randomly selected from a range of values, or randomly selected from a set of possible values. The number of protocol 602 rounds may be a fixed parameter of the cryptographic protocol 602. Alternatively, the number of protocol 602 rounds may be variable. The protocol 602 rounds may continue until a number of bits generated by the protocol (e.g., the sum of the sizes of the parcels 604, 606, 608, 610) exceeds a threshold. For example, the protocol 602 rounds may continue until the number of bits generated by the protocol 602 exceeds a maximum size in a set of standard key sizes.

Detailed examples of cryptographic key generation protocols suitable for incorporation in an embodiment of the invention are described in co-pending U.S. patent application Ser. No. 10/735,992, filed Dec. 15, 2003, entitled "WIRELESS ONLINE CRYPTOGRAPHIC KEY GENERATION METHOD," and in co-pending U.S. patent application Ser. No. 10/771,929, filed Feb. 4, 2004, entitled "DOMINO SCHEME FOR WIRELESS CRYPTOGRAPHIC COMMUNICATION AND COMMUNICATION METHOD INCORPORATING SAME."

In an embodiment of the invention, one or more parameters of the cryptographic protocol are varied as a function of a variant subset of the bits of the overkey 402 (FIG. 4). The variant subset may be the terminating bits 404 of the overkey 402, however, each embodiment of the invention is not so limited. The variant subset of bits may be the bits remaining after the key subset is extracted from the overkey 402 to serve as the live key 326, 328 (FIG. 3). As with the key subset, the bits in the variant subset need not correspond to contiguous bits of the overkey 402, and an order of the bits in the variant subset need not be the same as an order of the bits in the overkey 402. The variant subset of bits may be any suitable subset of the overkey 402.

Figure 7:
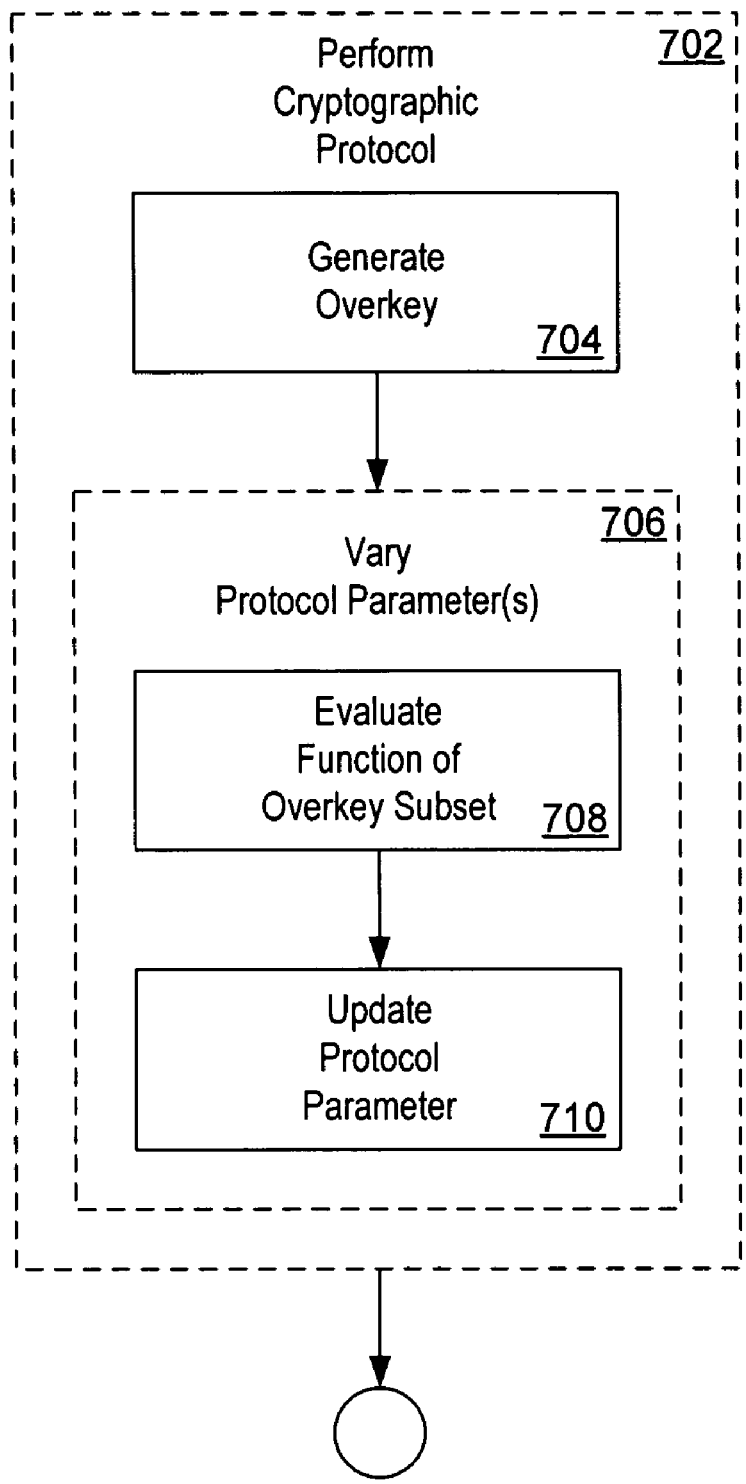
FIG. 7 is a flowchart depicting example steps for enhancing cryptography-based security in accordance with an embodiment of the invention.

FIG. 7 depicts examples steps for enhancing cryptography-based security in accordance with an embodiment of the invention. At step 702, a cryptographic protocol may be performed. For example, as described above, the cryptographic protocol may be performed by the secure communications modules 320 and 322 (FIG. 3). As for each step described below, step 702 may be incorporated into a series of steps, including steps not explicitly described below. In addition, step 702 may incorporate sub-steps including and/or in addition to those described below.

Step 704 and step 706 may be sub-steps of step 702. At step 704, an overkey may be generated. For example, the overkey 402 may be generated as described above with reference to FIGS. 4, 5 and 6. At step 706, one or more parameters of the cryptographic protocol may be varied. Examples of suitable cryptographic protocol parameters that may be varied at step 706 include the live key 326, 328 (FIG. 3), characteristics of the live key 326, 328 such as a cryptographic strength of the live key 326, 328 (key strength), a re-key schedule of the live key 326, 328, a set of cryptographic keys associated with the re-key schedule of the live key 326, 328, a re-keying timetable associated with the re-key schedule of the live key 326, 328, and/or any suitable cryptographic protocol parameter or combinations thereof.

Cryptographic protocol parameters that may be varied at step 706 need not be limited, for example, to a single layer of the Open Systems Interconnection (OSI) Reference Model. Examples of suitable trans-layer parameters include session layer parameters such as synchronization, transport layer parameters such as data packet sequencing, network layer parameters such as network path routing, data link layer parameters such as channel parameters and data framing, and physical layer parameters such as media selection, signal modulation and encoding. In each case, a particular parameter value may be selected from a set of valid parameter values. For example, a particular signal modulation may be selected from among binary phase shift keying (BPSK), quadrature phase shift keying (QPSK), and a set of available quadrature amplitude modulations (QAM) such as 16-QAM and 64-QAM.

As with step 702, step 706 may incorporate sub-steps. Step 708 and step 710 may be sub-steps of step 706. At step 708, a function of an overkey subset (up to and including the entire overkey, e.g., overkey 402 of FIG. 4) may be evaluated. For example, a function of the variant subset of the bits of the overkey 402 may be evaluated. Examples of suitable functions that may be evaluated at step 708 include a permutation of the overkey subset, an output of a pseudo-random number generator seeded with the overkey subset, a linear binary transformation of the overkey subset, and a nonlinear binary transformation the overkey subset. At step 710, a particular parameter of the cryptographic protocol may be updated. For example, the parameter of the cryptographic protocol may be updated with the result of the function evaluated at step 708.

Steps 708 and 710 may be performed for each cryptographic protocol parameter varied at step 706 (optionally in parallel). A same function need not be evaluated for each cryptographic protocol parameter. However, in an embodiment of the invention, a same and deterministic function of the overkey subset is evaluated at each computer 202, 204 (FIG. 2) participating in the cryptographic protocol, for example, so that those parameters of the cryptographic protocol that are varied may be varied in the same way at each participating node and, optionally, at the same time.

In an embodiment of the invention, synchronously varying parameters of the cryptographic protocol at participating nodes enhances a resistance of the varied parameters to characterization by an adversary. The resistance to characterization may be further enhanced by more frequent variation. In an embodiment of the invention, frequent variation of cryptographic protocol parameters is made more efficient by varying the parameters as functions of some or all of the overkey 402 (FIG. 4). Multiple cryptographic protocol parameter variations may be derived from a single overkey. For example, a set of cryptographic keys may be derived from a single overkey, which may alleviate problems associated with cryptographic key generation and/or distribution. A detailed example with respect to cryptographic keys is described below with reference to FIG. 8.

Figure 8:
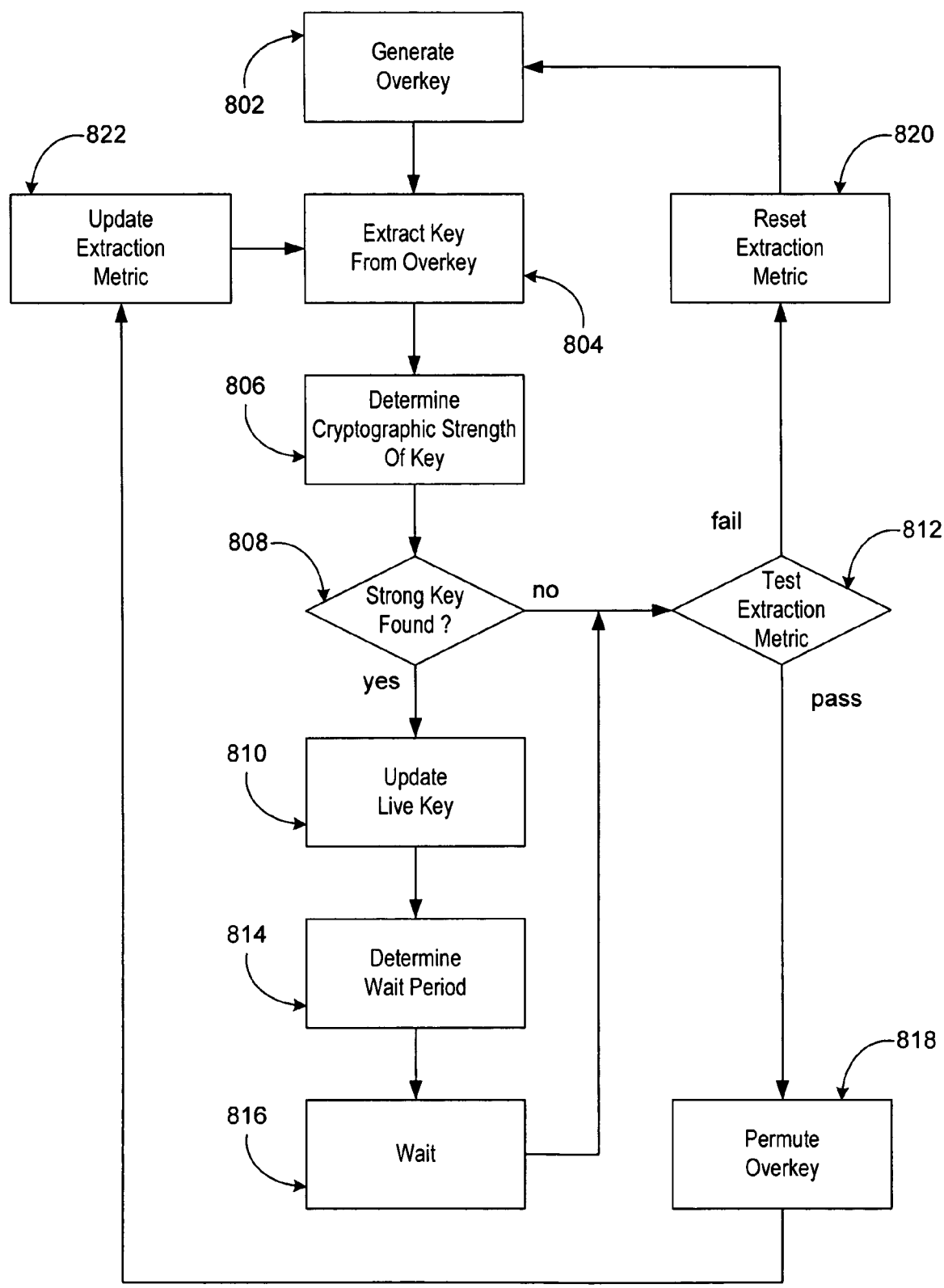
FIG. 8 is a flowchart depicting example steps for varying cryptographic protocol parameters in accordance with an embodiment of the invention.

FIG. 8 depicts example steps for varying cryptographic protocol parameters in accordance with an embodiment of the invention. For example each of the steps depicted in FIG. 8 may be performed by the computer 302 (FIG. 3) and/or the computer 304. Furthermore, when performed at multiple computers, performance of one or more of the steps may be synchronized at each computer.

At step 802, an overkey may be generated, for example, the overkey 402 (FIG. 4). Step 802 may be the same as, or similar to, step 704 (FIG. 7). At step 804, a cryptographic key may be extracted from the overkey generated at step 802, for example, the extracted key may be the key subset of bits of the overkey 402 as described above with reference to FIG. 4.

Cryptographic keys may differ in cryptographic strength. For example, some cryptographic key values may introduce regularities into the encrypted message 324 (FIG. 3) that aid an adversary attempting to characterize parameters of the associated cryptographic protocol. At step 806, a cryptographic strength of the extracted key may be determined. For example, the extracted key may be tested for statistical and/or spectral randomness as described by D. Knuth in "The Art of Computer Programming," Second Edition, Volume 2: Seminumerical Algorithms, Chapter 3: Random Numbers, published 1982 by the Addison Wesley Publishing Company.

At step 808, it may be determined if the extracted key is a strong cryptographic key. For example, the extracted key may be determined to be a strong cryptographic key if the cryptographic strength determined at step 806 is greater than a strong key threshold. If the extracted key is determined to be a strong cryptographic key, then a thread of execution (e.g., of a process of the computer 302, 304, depicted in FIG. 3) may progress to step 810. Otherwise, the thread of execution may progress to step 812. At step 810, the live key 326, 328 (FIG. 3) may be updated. For example, the live key 326, 328 may be updated with the cryptographic key extracted at step 804.

Once the live key 326, 328 (FIG. 3) is updated, the encrypted message 324 may be encrypted in accordance with the updated live key 326, 328. In an embodiment of the invention, the live key 326, 328, is updated periodically, that is, the secure communications module 320, 322 is re-keyed in accordance with a re-key schedule. The re-key schedule may specify a fixed live key 326, 328 update period (e.g., every 10 minutes). However, in an embodiment of the invention, the re-key schedule is varied according to a function of some or all of the overkey 402 (FIG. 4). For example, a delay between live key 326, 328 updates may be varied as a function of the variant subset of the overkey 402.

At step 814, a wait period, e.g., a delay between live key 326, 328 (FIG. 3) updates, may be determined. For example, a fixed delay between live key 326, 328 updates may be divided by a size of a set of cryptographic keys that may be derived from the overkey 402 (FIG. 4). That is, the secure communications module 320, 322 may re-key more frequently depending on the size of the set. Alternatively, or in addition, the delay between live key 326, 328 updates may be varied as a function of the variant subset of the overkey 402. For example, the wait period may be varied, within a specified range, in accordance with an output of a pseudo-random number generator seeded with the variant subset. The timetable of the re-key schedule may incorporate any such suitable wait period variation. As will be appreciated by one of skill in the art, the wait period variation may be deterministic so that, for example, a same variation may occur at each computer 302, 304 participating in the cryptographic protocol.

At step 816, the thread of execution may wait until the wait period determined at step 814 elapses. Once the wait period elapses, the thread of execution may progress to step 812 and thus ultimately to another live key 326, 328 (FIG. 3) update. Step 816 may be implemented with an alarm or interrupt. In addition, the thread of execution may terminate at step 816 and then be re-instantiated in response to the alarm or interrupt.

In an embodiment of the invention, the set of cryptographically utilizable keys that may be extracted from the overkey generated at step 802 is finite. For example, repeated extraction of cryptographic keys from the overkey 402 (FIG. 4) may result in a sequence of cryptographic keys that, beyond a certain point in the sequence, introduces regularities that aid an adversary attempting to characterize parameters of the associated cryptographic protocol. An extraction metric may indicate a degree to which such regularities are likely to be introduced by further cryptographic key extraction. The extraction metric may be a simple counter, but it need not be. For example, the extraction metric may correspond to a statistical and/or spectral randomness measure of the sequence of cryptographic keys extracted from the current overkey 402.

At step 812, the extraction metric may be tested, for example, compared to an extraction metric threshold. If the extraction metric passes the test, the thread of execution may progress to step 818. Otherwise, the thread of execution may progress to step 820.

At step 818, the overkey generated at step 802 (of a copy thereof) may be permuted, for example, in order to simplify extraction of cryptographic keys at step 804. The permutation operation may be a simple binary rotation of the overkey 402 (FIG. 4) but each embodiment of the invention is not so limited. Any suitable permutation of the bits of the overkey 402 may be performed at step 818.

At step 822, the extraction metric may be updated. For example, if the extraction metric is a counter, the counter may be incremented. At step 820, the extraction metric may be reset. For example, if the extraction metric is a counter, the counter may be reset to an initial value. In an embodiment of the invention, step 820 is incorporated into step 802. That is, the extraction metric is reset at the same time that the overkey 402 (FIG. 4) is (re-)generated. Similarly, in an embodiment of the invention, steps 818 and 822 are incorporated into step 804. That is, extraction of the live key 326, 328 (FIG. 3) from the overkey 402 may simultaneously update the extraction metric and, optionally, involve a permutation of the overkey 402 or a copy thereof.

In an embodiment of the invention, a set of cryptographic keys are extracted at step 804, the cryptographic strength of each extracted key is determined at step 806 and a strongest cryptographic key in the set is selected at step 808 for the live key 326, 328 (FIG. 3) update at step 810. In such an embodiment, steps 812-822 may be omitted or incorporated in earlier steps. In contrast, in other embodiments of the invention, steps 806 and 808 may be omitted. Any suitable combination of the steps depicted in FIG. 8 may be incorporated into an embodiment of the invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for enhancing cryptography-based security for communications using a cryptographic protocol having at least one parameter, the method comprising, on a first computer:
   participating in a cryptographic key generation protocol with a second computer, the cryptographic key generation protocol generating a set of bits sufficient for a cryptographic key and at least one additional bit based on a plurality of exchanges with the second computer;
   selecting said at least one parameter of the cryptographic protocol as a function of, at least, said at least one additional bit; and
   exchanging a message with the second computer, the message secured using the cryptographic key in accordance with the cryptographic protocol and the selected at least one parameter.

2. The method of claim 1, wherein:
   said at least one parameter of the cryptographic protocol comprises a key strength of the cryptographic key; and
   selecting said at least one parameter of the cryptographic protocol comprises:
      generating a set of cryptographic keys by, at least in part, permuting the set of bits together with said at least one additional bit;
      determining a cryptographic strength of each key in the set of cryptographic keys; and
      selecting a key in the set of cryptographic keys with a greatest cryptographic strength.

3. The method of claim 1, wherein:
   said at least one parameter of the cryptographic protocol comprises a re-key schedule; and
   selecting said at least one parameter of the cryptographic protocol comprises generating a set of cryptographic keys for the re-key schedule by) at least in part, permuting the set of bits together with said at least one additional bit.

4. The method of claim 1, wherein:
   said at least one parameter of the cryptographic protocol comprises a re-key schedule; and
   selecting said at least one parameter of the cryptographic protocol comprises varying a timetable of the re-key schedule as a function of, at least, said at least one additional bit.

5. A computer-readable storage medium having thereon computer-executable instructions that, when executed, perform the method of claim 1.

6. A computer-implemented method for enhancing cryptography-based security comprising:
   using a computer, participating in a cryptographic protocol specifying at least one cryptographic key size;
   generating an overkey comprising a plurality of bits from which a cryptographic key having the at least one cryptographic key size may be formed, the overkey comprising at least one bit more than said at least one cryptographic key size;
   extracting, from the overkey, a cryptographic key having a key size of one of said at least one cryptographic key size specified by the cryptographic protocol; and
   varying at least one parameter of the cryptographic protocol as a function of, at least, a nonempty set of bits of the overkey.

7. The method of claim 6, further comprising sending and/or receiving a message secured using the crytpographic key.

8. The method of claim 6, further comprising:
   permuting the overkey.

9. The method of claim 6, wherein said at least one parameter of the cryptographic protocol comprises a key strength of a cryptographic key employed by the cryptographic protocol.

10. The method of claim 6, wherein said at least one parameter of the cryptographic protocol comprises a re-key schedule.

11. The method of claim 6, wherein said at least one parameter of the cryptographic protocol comprises physical layer signal modulation.

12. The method of claim 6, further comprising:
   determining a cryptographic strength of the cryptographic key; and
   employing the cryptographic key in a performance of the cryptographic protocol if the cryptographic strength of the cryptographic key is greater than a threshold.

13. The method of claim 6, wherein:
   said at least one parameter of the cryptographic protocol comprises a re-key schedule specifying at least one cryptographic key update; and
   the method further comprises extracting, from the overkey, a cryptographic key for each of said at least one cryptographic key update.

14. The method of claim 6, wherein:
   said at least one parameter of the cryptographic protocol comprises a re-key schedule specifying at least one cryptographic key update; and
   the method further comprises determining, for each of said at least one cryptographic key update, a wait period to wait before performing the cryptographic key update, the wait period being determined as a function of, at least, the nonempty set of bits of the overkey.

15. A computer-readable storage medium having thereon computer-executable instructions that, when executed, perform the method of claim 6.

16. A computerized system for enhancing cryptography-based security comprising:
   a computing device;
   a plurality of modules executing on the computing device, the plurality of modules comprising:
   a secure communications module configured to, at least, participate in cryptographic protocol specifying at least one cryptographic key size; and
   an overkey module configured to, at least: generate an overkey comprising a plurality of bits from which a cryptographic key having the at least one cryptographic key size may be formed, the overkey comprising at least one bit more than said at least one cryptographic key size; and
   vary at least one parameter of the cryptographic protocol as a function of, at least, a nonempty set of bits of the overkey.

17. The system of claim 16, wherein the overkey module is incorporated into the secure communications module.

18. The system of claim 16, further comprising a plurality of computers, each computer comprising a version of the overkey module, the overkey module at each computer further configured to, at least, synchronously vary said at least one parameter of the cryptographic protocol.

19. The system of claim 16, wherein said at least one parameter of the cryptographic protocol comprises a key strength of a cryptographic key employed by the cryptographic protocol, and wherein the overkey module is configured to vary the key strength.

20. The system of claim 16, wherein said at least one parameter of the cryptographic protocol comprises a re-key schedule, and wherein the overkey module is configured to vary the re-key schedule.

* * * * *